J. McNISH.

Churn.

No. 630. Reissued Nov. 30, 1858.

N. PETERS, Photo-Lithographer, Washington, D. C.

UNITED STATES PATENT OFFICE.

JAMES MACNISH, OF BERLIN, WISCONSIN.

IMPROVED CHURN.

Specification forming part of Letters Patent No. 20,025, dated April 20, 1858; Reissue No. 630, dated November 30, 1858.

*To all whom it may concern :*

Be it known that I, JAMES MACNISH, of Berlin, in the county of Marquette and State of Wisconsin, have invented certain new and useful Improvements in Churns; and I do hereby declare that the following is a full, clear, and exact description of the same, reference being had to the accompanying drawings, and to the letters of reference marked thereon.

Figure 1:
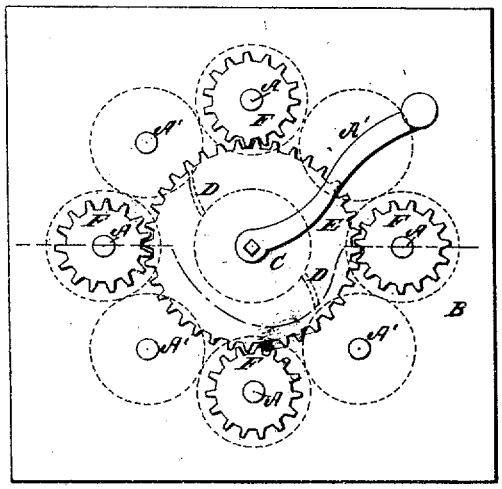
Figure 2:
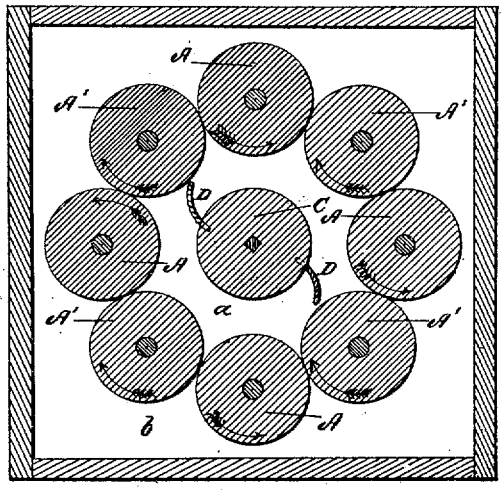
Figure 3:
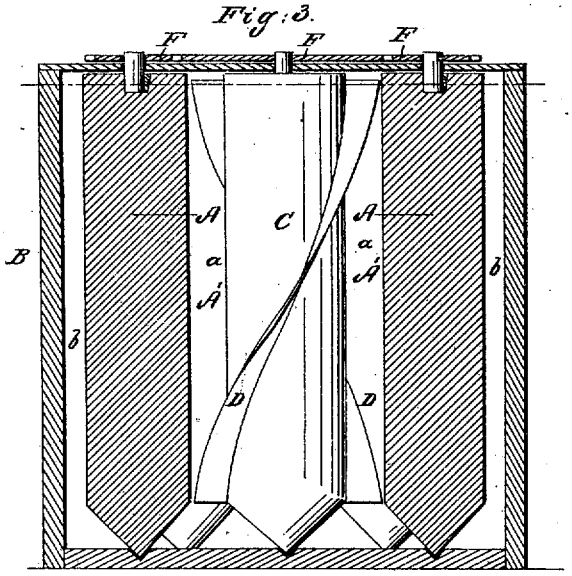
Figure 4:
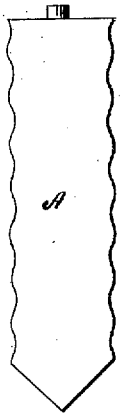
Figure 5:
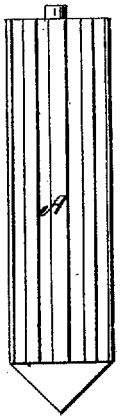

Figure 1 is a plan view of the churn. Fig. 2 is a horizontal section of the same. Fig. 3 is a vertical transverse section of the same in the line *x x* of Fig. 1. Figs. 4 and 5 show different styles of expressing-rollers which I propose to employ.

Similar letters of reference in each of the several figures indicate corresponding parts.

The nature of my invention consists in the production of butter from milk or cream by expression and friction, a mode of doing which will be hereinafter described.

In the annexed figures, A A′ represent a circle of rollers, of which the lower portions are cone-shaped, the points of the cones revolving in suitable orifices made in the bottom of the churn-box B at such distances from each other in the path of a circle as to admit of the periphery of the rollers touching at every point from the inverted base of the cone to the top of the rollers.

C′ is the central agitating shaft or roller provided with two or more semi-spiral flanges or wings, D D. A large spur-wheel, E, is fitted fast to the upper end of the roller C, and small pinion-wheels F F F F to the upper ends of the expressing or friction rollers A A A A. The large-spur-wheel and the pinions gear together as illustrated in Fig. 1, and it will be perceived by reference to Fig. 1 that by applying power to the central shaft and revolving it a direct motion will only be communicated to every alternate roller A, and that the rollers A, when set in motion in the direction indicated by the arrows 1, communicate by friction motion in an opposing direction to the roller A′, as indicated by the arrows 2.

By turning the central roller, C, rapidly the cream is dashed by the action of the flanges against the inside of the encircling rollers A A′, which are at the same time set in motion in the direction indicated by the arrows, thus pressing the milk or cream between them as it passes from the inside space, *a*, with the circle of rollers A A, into the space *b*, outside of the same.

The effect of the semi-spiral formation of the flanges is raising the milk or cream to the upper central portion of the churn and creating a partial vacuum in the lower central portion. This vacuum is immediately filled by cream rushing in from space *b* between the cone-shaped points of the rollers, its passage back being aided by the motion of the rollers in the direction of the arrow 2.

By this arrangement every portion of the milk or cream is repeatedly subjected to the friction of the rollers in the circle until all the globules which contain the butter are burst.

The rollers, as shown in Fig. 2, are smooth on the surface, and this form I think is best adapted to the churning of milk. For thin cream the corrugated roller (see Fig. 4) is best, and for thick cream the fluted roller. (See Fig. 5.)

It will be perceived that when this machine is set in motion three separate and distinct results are accomplished: First, the cream is raised from the bottom of the central space, *a;* second, it is dashed against the inside of the encircling rollers; third, it is subject to close friction in its passage between the rollers, and thus all the conditions necessary to produce good butter in the shortest possible time are fulfilled.

The rollers are all secured in the iron frame at top and have no fastening below. All that is necessary when the churning is completed is to lift off the top frame, which necessarily takes out the rollers and removes every impediment to gathering the butter.

I do not wish to confine myself to the particular arrangement of the apparatus herein specified, as there are other arrangements which will readily suggest themselves which will be obvious evasions of my invention.

I have conceived the idea of breaking or bursting the globules or sacks which contain the butter by passing them between two solid substances, either by the moving of one or both of them, whether these substances be rubbers or rollers, or what not.

Having thus fully described my invention, what I claim as new, and desire to secure by Letters Patent, is—

Expressing the butter from the globules or sacks of milk or cream by friction—such as rubbing, mashing, or grinding—when accomplished in any manner, the equivalent of that herein specified.

In testimony whereof I hereunto set my hand.

JAMES MACNISH.

Witnesses:
G. COOPER,
C. M. ALEXANDER.